United States Patent
Amielh-Caprioglio et al.

(10) Patent No.: US 7,640,487 B2
(45) Date of Patent: Dec. 29, 2009

(54) METHOD OF FILTERING A BITSTREAM ACCORDING TO USER SPECIFICATIONS

(75) Inventors: Myriam Amielh-Caprioglio, Paris (FR); Sylvain Devillers, Paris (FR); Patrice Mireux, Suresnes (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 1108 days.

(21) Appl. No.: 10/517,103

(22) PCT Filed: Jun. 4, 2003

(86) PCT No.: PCT/IB03/02462

§ 371 (c)(1), (2), (4) Date: Dec. 7, 2004

(87) PCT Pub. No.: WO03/105441

PCT Pub. Date: Dec. 18, 2003

(65) Prior Publication Data

US 2005/0229234 A1 Oct. 13, 2005

(30) Foreign Application Priority Data

Jun. 11, 2002 (EP) .................................. 02291452

(51) Int. Cl.
*G06F 17/00* (2006.01)
*G06F 3/00* (2006.01)
(52) U.S. Cl. ........................................ 715/203; 725/46
(58) Field of Classification Search ................. 715/203, 715/204; 725/46, 135
See application file for complete search history.

(56) References Cited

U.S. PATENT DOCUMENTS

| 6,564,263 | B1 * | 5/2003 | Bergman et al. | 709/231 |
|---|---|---|---|---|
| 6,877,134 | B1 * | 4/2005 | Fuller et al. | 715/202 |
| 7,203,692 | B2 * | 4/2007 | Tabatabai et al. | 707/102 |
| 2001/0052130 | A1 * | 12/2001 | Yap et al. | 725/90 |
| 2002/0099661 | A1 * | 7/2002 | Kii et al. | 705/51 |
| 2002/0131511 | A1 * | 9/2002 | Zenoni | 375/240.28 |

FOREIGN PATENT DOCUMENTS

WO    WO0199416 A2    12/2001

OTHER PUBLICATIONS

Pfeiffer, Silvia, et al, "TV Anytime as an Application Scenario for MPEG-7", Proceedings of the ACM Multimedia 2000 Workshops, Marina del Rey, CA, Nov. 4, 2000, ACM International Multimedia Conference, New York, NY, ACM, US, Conf 8, pp. 89-92, XP001003701, ISBN: 1-58113-311-1.*

(Continued)

*Primary Examiner*—Laurie Ries

(57) ABSTRACT

The invention proposes a method of filtering a bitstream according to user specifications. The proposed method uses a semantic description and a syntactical description of the bitstream. The semantic description is scanned to select the elementary units that match the user specification. The time is used as a linking mechanism between the semantic description and the syntactical description to locate the elements of the syntactical description that are to be removed. A filtered syntactical description is generated by removing the located elements. Finally, a filtered bitstream is generated from the filtered syntactical description.

6 Claims, 1 Drawing Sheet

OTHER PUBLICATIONS

DeKock, E.A, et al, "YAPI: Application Modeling for Signal Processing Systems", DAC '00: Proceedings of the 37th Conference on Design Automation, Jun. 2000, pp. 402-405.*

S. Pfeiffer et al, "TV Anytime as an Application Scenario for MPEG-7", Proceedings ACM Multimedia, vol. Conf. 8, Nov. 4, 2000, pp. 89-92.

S. Devillers, et al, "Bitstream Syntax Description Language", International Organisation for Standardisation, Fairfax/May 2002.

"Proposal of a Generic Bitstream Syntax Description Language" by J. Heuer, et al. (reference ISO/IEC JTC1/SC29/WG11 MPEG02/M8291 Fairfax/May 2002).

"Bitstream Syntax Description Language" by Sylvain Devillers, et al. (reference ISO/IEC JTC1/SC29/WG11 MPEG/M8273, Fairfax, May 2002).

* cited by examiner

1

METHOD OF FILTERING A BITSTREAM ACCORDING TO USER SPECIFICATIONS

FIELD OF THE INVENTION

The invention relates to a method of filtering a bitstream using a syntactical description of said bitstream and at least a user specification.

The invention also relates to a device comprising means for implementing such a filtering method.

The invention also relates to a system comprising a server device, a transmission channel and a user device wherein said server and/or said user devices comprise means for implementing such a filtering method.

The invention also relates to a program comprising instructions for implementing such a filtering method when said program is executed by a processor.

The invention also relates to a filtered bitstream obtained by applying such a filtering method.

The invention allows filtering out undesired scenes in a video, for example in a video streamed via the internet or transmitted via cable network or any other type of network. It may be used to implement a parental control, for example, for skipping scenes having a violent or sexual connotation.

BACKGROUND OF THE INVENTION

Such a filtering method is described in the ISO document "Proposal of a Generic Bitstream Syntax Description Language" by J. Heuer, A. Hutter, G. Panis, H. Hellwagner, H. Kosch and C. Timmerer (reference ISO/IEC JTC1/SC29/WG11 MPEG02/M8291 Fairfax/May 2002).

In this ISO document, it is proposed to act on a syntactical description of the bitstream rather than on the bitstream itself. A syntactical description is defined as being an XML document describing the high-level structure of the bitstream. The proposed syntactical description comprises elements that are marked with semantically meaningful data. The proposed method consists in defining transformations aimed at removing the elements that are marked with a specific marker from the syntactical description. Then a filtered bitstream is generated from the transformed syntactical description.

An advantage of such a solution is that it generates a filtered bitstream in which the prohibited passages are removed.

This solution uses specific markers and specific transformations associated with said specific markers.

The invention proposes an alternative solution that avoids being limited to predefined markers.

SUMMARY OF THE INVENTION

According to the invention, a method of filtering a bitstream comprising elementary units having a time position, and first timing data indicative of said time positions, uses:

a syntactical description of said bitstream, said syntactical description comprising elements describing said elementary units and containing said first timing data, a semantic description of said bitstream, said semantic description comprising second timing data and characterizing data relating to one or more elementary units, said second timing data being indicative of the time positions of said elementary units, at least a user specification, and comprises the steps of:

searching in said semantic description for the characterizing data that match said user specification to identify matching elementary units, deriving time positions for said matching elementary units from said second timing data, using said first timing data to locate in said syntactical description the elements corresponding to said time positions, generating a filtered syntactical description in which the located elements are removed, generating a filtered bitstream from said filtered syntactical description.

Instead of adding specific markers to the syntactical description, the invention uses a separate semantic description of the bitstream. Advantageously, this semantic description is compliant with the MPEG-7 standard. The time position of the elementary units is used as linking mechanism between the semantic description and the syntactical description: the elementary units that match the user specification are identified by searching the semantic description; then the time positions of the matching elementary units are determined; and finally the determined time positions are used to locate the corresponding elements in the syntactical description.

By doing so, the user is not limited to specific markers for defining the filtering specification. This is more convenient for the user.

All the metadata contained in the semantic description are used for filtering, which brings more flexibility.

In many applications, audio/video bitstreams are associated with a MPEG-7 description. It is advantageous to use this existing and standardized description instead of enhancing the syntactical description with specific markers.

In an advantageous embodiment, said syntactical description is an XML document (extensible Markup Language) and said filtered syntactical description is generated by applying to said syntactical description a parametric transformation defined in an XSL style sheet (extensible StyleSheet) having said time positions as input parameters. XML and XSL are defined by the W3C consortium.

An XSL style sheet is a text file, written in the XML mark-up language. XSL style sheets were specifically designed to transform XML documents: they contain instructions to be applied by an XSL processor to output a transformed XML document from an input XML document.

BRIEF DESCRIPTION OF THE DRAWINGS

The invention will be further described with reference to the accompanying drawings.

DESCRIPTION OF A PREFERRED EMBODIMENT

Figure 1:
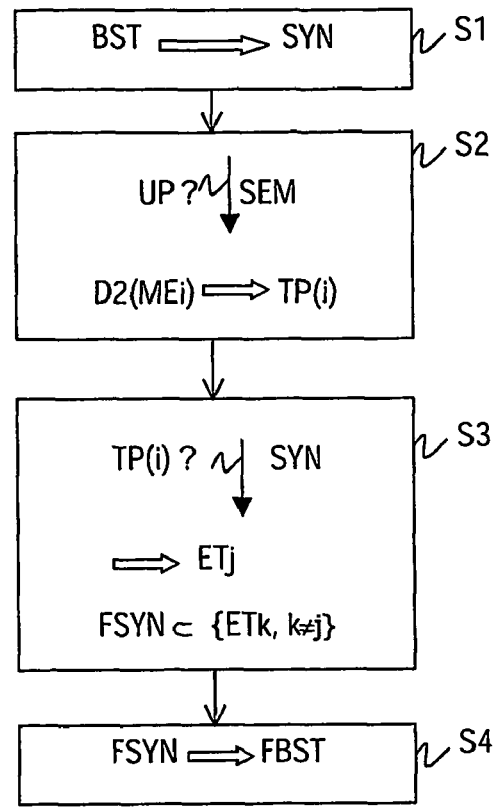
FIG. 1 is a block diagram describing a filtering method according to the invention.

A method of filtering a bitstream according to a user specification will now be described. This method uses:

a semantic description of the bitstream,
a syntactical description of the bitstream.

A semantic description of a bitstream comprises metadata relating to the content of the bitstream and giving a meaningful description of said content. MPEG-7 is a well-known standard for semantic descriptions of audio/video content. The creation of such a semantic description involves human participation. The semantic description is usually created once at the stage of the bitstream generation, and then appended to the bitstream.

A MPEG-7 semantic description may comprise elements called <CreationInformation> carrying author-generated information about the content. This information is not explicitly depicted in the content, and usually cannot be extracted from the content. The <CreationInformation> elements notably contain a sub-element called <Classification>. The object of the <Classification> element is to give descriptions allowing classification of the content. For instance, the following descriptions are proposed in MPEG-7:

<Genre>: describes one genre that applies to the content,
<Subject>: describes the subject of the content with a textual annotation,
<MarketClassification>: describes one targeted market for the content,
<AgeClassification>: describes the target age range for the content,
<ParentalGuidance>: describes one parental guidance for the content,
<Media review>: describes review of the content.

The contents of all these elements are advantageously used as characterizing data.

A MPEG-7 semantic description also comprises elements called <MediaTime> carrying timing data relating to the bitstream. These timing data are the second timing data of the invention. MPEG-7 proposes several formats for defining said second timing data. One example will be given below.

A syntactical description of a bitstream describes the structure of the bitstream. Advantageously, such a syntactical description is generated automatically from the bitstream and from a model describing the syntax of the bitstream format. Such a syntactical description can be generated once and appended to the bitstream. It can also be generated by an application when required. The ISO document "Bitstream Syntax Description Language" by Sylvain Devillers, Myriam Amielh, and Thierry Planterose (reference ISO/IEC JTC1/SC29/WG11 MPEG/M8273, Fairfax, May 2002), describes a method of generating a syntactical description of a bitstream from a model describing the syntax of the bitstream format (and reciprocally for generating a bitstream from a syntactical description of said bitstream and from the model describing the syntax of the bitstream format).

In the continuation of the description the generation of the syntactical description of the bitstream is regarded as being a step of the filtering method. This is not restrictive. The syntactical description can also be appended to the bitstream to be filtered.

FIG. 1 is a description in blocks of a method of filtering a bitstream BST according to a user specification UP. The user specification UP is a set of one or more key words. The bitstream BST comprises elementary units and first timing data from which a time position can be derived for each elementary unit.

The bitstream BST is semantically described in a semantic description SEM, and syntactically described in a syntactical description SYN.

The semantic description SEM comprises second timing data and characterizing data relating to one or more elementary units. The second timing data are indicative of the time positions of the elementary units. The syntactical description comprises elements describing the elementary units and containing the first timing data.

As indicated in FIG. 1, the filtering method of the invention comprises four steps S1, S2, S3 and S4.

At step S1, the syntactical description SYN is generated from the bitstream BST.

At step S2, the semantic description SEM is searched for characterizing data that match the user specification UP. The elementary units MEi to which the matching characterizing data relates are called matching elementary units. The second timing data D2(MEi) relating to the matching elementary units are used to derive a time position TP(i) for each matching elementary unit. Said time positions are used as input parameters at step S3.

At step S3, the syntactical description SYN is scanned to detect the elements ETj that have first timing data D1(ETj) corresponding to the time positions TP(i) derived at step S2. A filtered syntactical description FSYN is generated in which said elements are removed.

At step S4, a filtered bitstream FBST is generated from the filtered syntactical description FSYN. For example, the filtered bitstream FBST is generated as indicated in the above described document.

An example will now be given for illustrative purposes. In this example, the bitstream is compliant with the MPEG-4 standard. This is not restrictive. The invention is applicable to other encoding formats.

The elementary units of a MPEG-4 video are called Video Object Plane (VOP). A syntactical description of the illustrative bitstream is given below:

```
<Bitstream
    xml:base=" http://www.mpeg7.org/the_video.mpg"
    xmlns="MPEG4"
    xmlns:mp4="MPEG4"
    xmlns:xsi="http://www.w3.org/2001/XMLSchema-instance"
    xsi:schemaLocation=" http://www.example.org/MPEG4
    Schemas/MPEG4.xsd">
        <VO>
        ...
        </VO>
        <VOL>
        ...
            < VOP_time_increment_resolution > 40
            </ VOP_time_increment_resolution>
        ...
            <fixed_VOP_rate>1</fixed_VOP_rate>
            <fixed_VOP_time_increment> 1
            </fixed_VOP_time_increment >
        ...
        </VOL>
        <VOP>
            <StartCode>000001B6</StartCode>
            <Type>0</Type>
            <Stuffing>16</Stuffing>
            <Payload>100-4658</Payload>
        </VOP>
        <VOP>
            <StartCode>000001B6</StartCode>
            <Type>1</Type>
            <Stuffing>17</Stuffing>
            <Payload>4664-4756</Payload>
        </VOP>
    ...
</Bitstream>
```

This illustrative syntactical description contains <VOP> elements representing elementary units, and first timing data. The first timing data are contained in:

the <VOP_time_increment_resolution> element, the <fixed_VOP_rate> element, the <fixed_VOP_time_increment> element.

The <VOP_time_increment_resolution> indicates the number of ticks within one second. Thus, in this example, one second is divided into 40 ticks.

The <fixed_VOP_rate> is a one-bit flag which indicates whether all VOPs are coded with a fixed VOP rate. When it is equal to "1", all the distances between the display time of any two successive VOPs in the display order are constant.

The <fixedVOP_time_increment> indicates the number of ticks between two successive VOPs in the display order. In this example, one VOP is displayed every 25 ms (1/40 s).

A semantic description of the illustrative bitstream will now be given below. This semantic description is compliant with the MPEG-7 standard:

The <MediaRelTimePoint> element indicates the duration of the video segment. The duration of the first video segment S1 is equal to PT15M20S. The duration of the second video segment S2 is PT1M30S.

The second video segment S2 contains characterizing data in the <MinimumAge> element. According to these characterizing data, the minimum recommended age for watching this second video segment S2 is 18.

Let us assume that the user specifies that the scenes not recommended under 18 must be deleted. First the semantic description is scanned. For each video segment, if the minimum age is higher than or equal to 18, the time position of the

```
<Mpeg7>
    <Description xsi:type="ContentEntityType">
        <MultimediaContent xsi:type="VideoType">
            <Video>
                <MediaLocator>
                    <MediaUri>http://www.mpeg7.org/the_video.mpg</MediaUri>
                </MediaLocator>
                <CreationInformation>
                    <Creation>
                        <Title> Basic Instinct </Title>
                    </Creation>
                </CreationInformation>
      ↑         <VideoSegment>
      |             <MediaTime>
      |                 <MediaRelTimePoint mediaTimeBase="//MediaLocator[1]">
      S1|                     PT0S
      |                 </MediaRelTimePoint>
      |                 <MediaDuration>
      |                     PT15M20S
      |                 </MediaDuration>
      |             </MediaTime>
      |         </VideoSegment>
      ↓
      ↑         <VideoSegment>
      |             <CreationInformation>
      |                 <Classification>
      |                     <ParentalGuidance>
      S2|                         <MinimumAge>18</MinimumAge>
      |                     </ParentalGuidance>
      |                 </Classification>
      |             </CreationInformation>
      |             <MediaTime>
      |                 <MediaRelTimePoint mediaTimeBase="//MediaLocator[1]">
      |                     PT15M20S
      |                 </MediaRelTimePoint>
      |                 <MediaDuration>
      |                     PT1M30S
      |                 </MediaDuration>
      ↓             </MediaTime>
                </VideoSegment>
                ...
            </Video>
        </MultimediaContent>
    </Description>
</Mpeg7>
```

This illustrative semantic description comprises two video segments S1 and S2, each of them corresponding to a plurality of VOPs. Each video segment comprises second timing data contained in:

the <MediaRelTimePoint> element, the <MediaDuration> element.

The <MediaRelTimePoint> element indicates the start time of the video segment by reference to a time base. The time base is the starting time of the video. The first video segment S1 starts at time PT0S (0 second). The second video segment S2 starts at time PT15M20S (15 minutes 20 seconds, or 920 seconds).

video segment is derived from the second timing data. In the illustrative example, all VOPs contained in the second video segment S2 are matching elementary units. Their time positions correspond to the time interval [920-1010] (it is derived from the second timing data contained in the semantic description: start time and duration of the video segment). Then the first timing data contained in the syntactical description are used to identify the VOPs to be deleted. As mentioned above, in this example, the first timing data indicate that one VOP is displayed every 25 ms. Therefore, the time positions [920-1010] correspond to VOP number 36800 till VOP number 40400.

Now an example of a parametric XSL style sheet that may be applied to remove the matching VOPs will be described. The following style sheet defines two parameters firstVOP-Number and lastVOPNumber. It is applied to remove all the VOPs whose time position is between the values firstVOP-Number and lastVOPNumber. In the above described example, the value of the two parameters are:

firstVOPNumber=920/0.025=36 800 lastVOPNumber=1010/0.025=40 400

```
<?xml version="1.0"?>
<xsl:stylesheet
    xmlns:xsl="http://www.w3.org/1999/XSL/Transform"
    xmlns:m="MPEG4"
    version="1.0">
  <!-- Parameters-->
  <xsl:param name="firstVOPNumber">0</xsl:param>
  <xsl:param name="lastVOPNumber">0</xsl:param>
  <!-- Match all: default template -->
  <xsl:template name="tplAll" match="@*|node( )">
    <xsl:copy>
      <xsl:apply-templates select="@*|node( )"/>
    </xsl:copy>
  </xsl:template>
  <!-- Match root element -->
  <xsl:template match="m:Bitstream">
      <xsl:copy>
      <xsl:apply-templates select="@*|node( )"/>
    </xsl:copy>
  </xsl:template>
  <!-- Match firstVOPNumber VOP to lastVOPNumber VOP -->
  <xsl:template name="tpl_VOP_NtoM"
          match="m:VOP[position( )>firstVOPNumber
          and position( )<lastVOPNumber]">
    <!-- Nothing ! -->
  </xsl:template>
</xsl:stylesheet>
```

Figure 2:
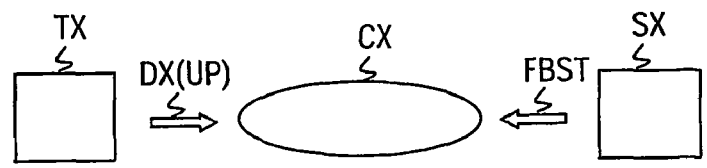
FIG. 2 is block diagram of a first embodiment of a system according to the invention.

A first embodiment of a system according to the invention is represented schematically in FIG. 2. This system comprises a server device SX, a transmission channel CX and a user device TX. In this embodiment, the user device TX sends a demand for a content to the server device SX via the transmission channel CX. The demand DX comprises the user specification UP. Upon reception of the demand DX, the server device SX recovers the bitstream that corresponds to the demanded content, filters the recovered bitstream according to the user specification as described above, and sends the filtered bitstream FBST to the user device TX via said transmission channel CX. Thus the filtering is done at the server end.

Figure 3:
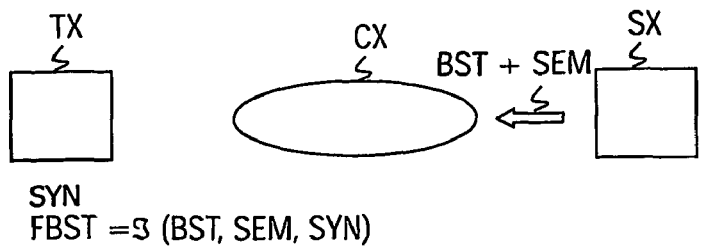
FIG. 3 is block diagram of a second embodiment of a system according to the invention.

A second embodiment of the invention is represented schematically in FIG. 3. This system comprises a server device SX, a transmission channel CX and a user device TX. In this embodiment, the user device TX receives a bitstream BST and a semantic description SEM of the bitstream BST from the server device SX via the transmission channel CX. Locally, a user specification UP is captured and a syntactical description SYN of the bitstream BST is generated. Then the bitstream BST is filtered as described above, and the corresponding filtered bitstream FBST is generated. Thus the filtering is done at the user end.

In another embodiment (not represented here), the user device receives the syntactical description SYN of the bitstream beforehand instead of the bitstream itself. Thus it does not have to generate the syntactical description of the bitstream.

Advantageously, the above-described steps are implemented by means of sets of instructions being executable under the control of one or more computers or digital processors.

It is to be noted that, with respect to the described devices and filtering method, modifications or improvements may be proposed without departing from the scope of the invention. The invention is thus not limited to the examples provided. It is not restricted to the use of any particular format, standard or language. It is not restricted to video content.

More particularly, in the example given above, a specific type of correlation was described between the first timing data, the time position, and the second timing data. This is not restrictive. The first timing data vary with the encoding format of the bitstream. The second timing data described above are one of the format proposed in the MPEG-7 standard. However, other formats are available in the same standard, and other standards or types of descriptions may be used. The only necessary condition is that a time position may be derived from both the first timing data and the second timing data.

Use of the verb to "comprise" and its conjugations does not exclude the presence of elements or steps other than those stated in the claims.

The invention claimed is:

1. A method of filtering a bitstream having elementary units having a time position, and first timing data indicative of said time positions, a syntactical description of said bitstream, said syntactical description having elements describing said elementary units and containing said first timing data, a semantic description of said bitstream, said semantic description comprising second timing data and characterizing data relating to one or more elementary units, said second timing data being indicative of the time positions of said elementary units, at least a user specification, said method comprising the steps of:
   by a filtering processor,
      searching in said semantic description for the characterizing data that match said user specification to identify matching elementary units,
      deriving time positions for said matching elementary units from said second timing data,
      using said first timing data to locate in said syntactical description the elements corresponding to said time positions,
      generating a filtered syntactical description in which the located elements are removed,
      generating a filtered bitstream from said filtered syntactical description.

2. A filtering method as claimed in claim 1, wherein said syntactical description is an XML document and said filtered syntactical description is generated by applying to said syntactical description a parametric transformation defined in an XSL style sheet having said time positions as input parameter.

3. A filtering method as claimed in claim 1, wherein said semantic description is compliant with the MPEG-7 standard, and said second timing data are contained in <MediaTime> elements.

4. A device for filtering a bitstream comprising: elementary units having a time position, and first timing data indicative of said time positions, a syntactical description of said bitstream, said syntactical description having elements describing said elementary units and containing said first timing data, a semantic description of said bitstream, said semantic description having second timing data and characterizing data relating to one or more elementary units, said second timing data being indicative of the time positions of said elementary units, at least a user specification, a filtering processor, said filtering processor configured for
- searching in said semantic description for the characterizing data that match said user specification to identify matching elementary units,
- deriving time positions for said matching elementary units from said second timing data,
- using said first timing data to locate in said syntactical description the elements corresponding to said time positions,
- generating a filtered syntactical description in which the located elements are removed,
- generating a filtered bitstream from said filtered syntactical description.

5. A transmission system comprising:
- a server device,
- a transmission channel,
- a user device, said user device being intended to receive, from said server device via said transmission channel, a bitstream comprising elementary units having a time position and first timing data indicative of said time positions, and a semantic description of said bitstream, said semantic description comprising second timing data and characterizing data relating to one or more elementary units, said second timing data being indicative of the time positions of said elementary units, said user device having a processor for
- capturing at least a user specification,
- generating a syntactical description of said bitstream, said syntactical description comprising elements describing said elementary units and containing said first timing data,
- searching in said semantic description for the characterizing data that match said user specification to identify matching elementary units,
- deriving time positions for said matching elementary units from said second timing data,
- using said first timing data to locate in said syntactical description the elements corresponding to said time positions,
- generating a filtered syntactical description in which the located elements are removed,
- generating a filtered bitstream from said filtered syntactical description.

6. A transmission system comprising:
- a server device,
- a transmission channel,
- a user device, said user device having means for sending a demand for a content to said server device via said transmission channel, said demand including a user specification, and said server device having a processor for filtering a bitstream corresponding to the demanded content according to said user specification and for sending the filtered bitstream to said user device via said transmission channel,
- wherein said bitstream includes elementary units having a time position and first timing data indicative of said time positions, is semantically described in a semantic description comprising second timing data and characterizing data relating to one or more elementary units, said second timing data being indicative of the time positions of said elementary units, is syntactically described in a syntactical description comprising elements describing said elementary units and containing said first timing data, and,
- said processor for filtering the bitstream that correspond to the demanded content is configured for searching in said semantic description for the characterizing data that match said user specification to identify matching elementary units, deriving time positions for said matching elementary units from said second timing data, using said first timing data to locate in said syntactical description the elements corresponding to said time positions, generating a filtered syntactical description in which the located elements are removed, generating a filtered bitstream from said filtered syntactical description.

* * * * *